United States Patent [19]

Squires

[11] 4,433,282
[45] Feb. 21, 1984

[54] MONOLITHIC VOLTAGE DIVIDER

[75] Inventor: David R. Squires, Los Altos, Calif.

[73] Assignee: Intersil, Cupertino, Calif.

[21] Appl. No.: 328,519

[22] Filed: Dec. 8, 1981

[51] Int. Cl.$^3$ .............................................. G05F 1/56
[52] U.S. Cl. ..................................... 323/281; 363/62;
368/204
[58] Field of Search .................. 363/62, 147; 368/204;
323/281

[56] References Cited

U.S. PATENT DOCUMENTS

| | | | |
|---|---|---|---|
| 3,046,469 | 7/1962 | Young | 323/273 |
| 3,816,803 | 6/1974 | Gordon | 320/1 |
| 3,975,671 | 8/1976 | Stoll. | |
| 4,001,664 | 1/1977 | Hyltin. | |
| 4,047,091 | 9/1977 | Hutchines et al. | 363/59 |
| 4,061,929 | 12/1977 | Asano | 307/246 |
| 4,068,295 | 1/1978 | Portmann | 363/60 |
| 4,106,086 | 8/1978 | Holbrook et al. | 363/60 |
| 4,205,369 | 5/1980 | Asano | 363/62 |
| 4,390,833 | 6/1983 | Tzeng | 323/281 |
| 4,397,563 | 8/1983 | Ichinose | 323/281 |

FOREIGN PATENT DOCUMENTS

| | | | |
|---|---|---|---|
| 2530870 | 2/1976 | Fed. Rep. of Germany. | |
| 52-26419 | 2/1977 | Japan. | |
| 54-147420 | 11/1979 | Japan | 363/62 |
| 55-144772 | 11/1980 | Japan | 363/62 |

Primary Examiner—William H. Beha, Jr.
Attorney, Agent, or Firm—Spensley, Horn, Jubas & Lubitz

[57] ABSTRACT

A voltage divider circuit is provided which can be fabricated as a portion of a monolithic integrated circuit without requiring any external capacitors. The voltage divider circuit has a pair of capacitors which are alternately switched between series connection and parallel connection to divide an input supply voltage. The voltage divider circuit can thereby provide a second supply voltage of one half the input supply voltage.

20 Claims, 10 Drawing Figures

Fig.1

Fig. 2A
TIME PERIOD ①

Fig. 2B
TIME PERIOD ②

Fig. 3

Fig. 4A
TIME PERIOD ①

Fig. 4B
TIME PERIOD ②

Fig. 4C
TIME PERIOD ③

Fig. 4D
TIME PERIOD ④

Fig. 5A
TIME PERIOD ①

Fig. 5B
TIME PERIOD ②

MONOLITHIC VOLTAGE DIVIDER

BACKGROUND OF INVENTION

1. Field of the Invention

The present invention relates to power supplies, and more particularly, to power supplies for integrated circuits.

2. Description of the Prior Art

A variety of integrated circuit applications often require power to be supplied at two or more different supply voltages. For example, multiplexed liquid crystal displays (LCD's) for digital quartz integrated circuit watches often require two supply voltages, typically −1.55 volts and −3.10 volts. The smaller voltage can be supplied directly by a battery such as a 1.55 volt silver oxide battery. The larger supply voltage is typically generated by a switched capacitor voltage doubler which doubles the voltage supplied by the battery.

These voltage doublers often require two relatively large capacitors, typically 0.047 microfarads in size. Because of their relatively large size, these capacitors are typically fabricated as ceramic chip capacitors which generally are not a part of the integrated circuit chip. Thus, capacitors which are external to the chip must be made separately and physically connected to the integrated circuit chip. This can increase the cost and complexity of the manufacturing process and increase the cost of the final product. Furthermore, the external connections can break or come apart, thereby decreasing the reliability of the product.

In addition, the external capacitors often are used to drive the displays directly. As a display draws current from the capacitors, the capacitors need to be refreshed. As a result, the switching circuitry which refreshes the capacitors consume current which can shorten the life of the battery.

SUMMARY OF THE INVENTION

It is an object of the present invention to provide an improved monolithic integrated circuit power supply capable of supplying two different supply voltages from a single input supply voltage without requiring large external capacitors.

It is another object of the present invention to provide a voltage divider power supply having low current consumption and a stable output.

It is still another object of the present invention to provide an integrated circuit power supply capable of providing a supply voltage which is a predetermined fraction of an input supply voltage.

The present invention provides a voltage divider circuit which includes two relatively small capacitors which can be conveniently integrated on a monolithic integrated circuit chip. The two capacitors are periodically switched between two alternate modes. In the first mode, the capacitors are connected in series and the supply voltage of a power supply is applied across the series-connected capacitors. In the second mode, the capacitors are switched to a parallel connection. The capacitors are repeatedly switched between these two modes by a control signal. As will become clear in the following detailed description, the voltage across each capacitor asymptotically approaches one half the voltage level of the supply voltage. Thus the voltage divider circuit divider or halves the supply voltage of the input power supply.

The resultant voltage across the capacitors is used as a reference voltage input to a voltage regulator having a high input impedance. The voltage regulator includes a driver buffer which provides the second supply voltage of one half that of the input power supply, to an output load such as a display. These components, as well as switched capacitors, can all be integrated on a single chip to simplify the assembling of devices requiring two supply voltages. Furthermore, the voltage divider of the present invention is further characterized by its extremely low power consumption and stable operation.

DETAILED DESCRIPTION OF THE DRAWINGS

Figure 1:
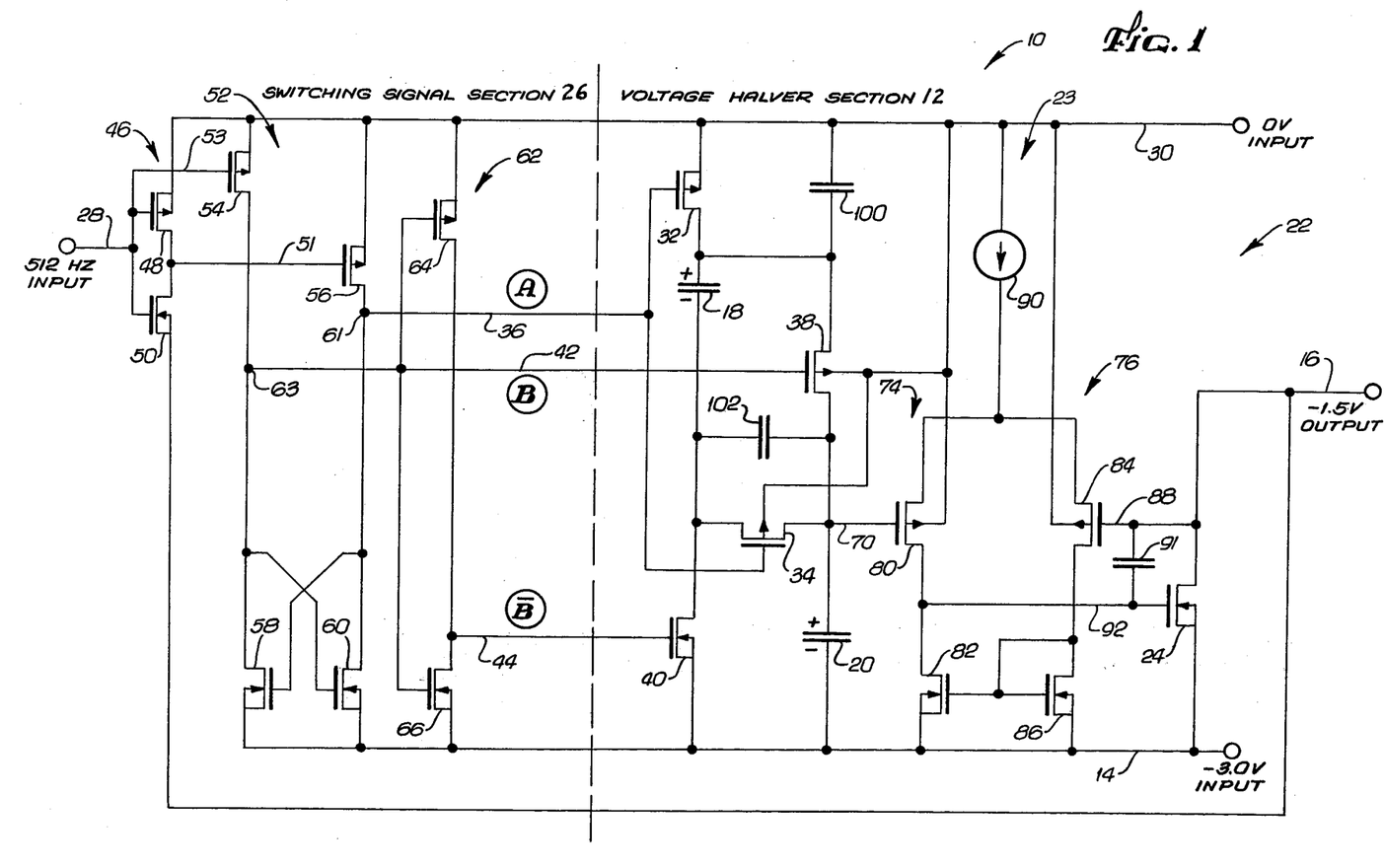
FIG. 1 is a schematic diagram of a voltage divider circuit employing a preferred embodiment of the present invention.

Referring now to FIG. 1, a preferred embodiment of a voltage divider circuit in accordance with the present invention is indicated generally at 10. The voltage divider circuit 10 includes a voltage halver section 12 which divides a −3.0 volt input supply voltage at a bus 14 to an output supply voltage of −1.5 volts, indicated at an output 16. Other supply voltages are, of course, possible with their particular value dependent upon the particular application.

The voltage divider circuit 10 can be fully integrated as a portion of a monolithic integrated circuit, for example, a digital wristwatch circuit. Accordingly, the divider circuit 10, as an integral part of a watch circuit, can provide the two different supply voltages (here −3.0 and −1.5 volts) generally required by a two level multiplexed (duplexed) liquid crystal display. The liquid crystal display (LCD) displays the time information generated by the watch circuit, often in a digital readout format.

Figure 2A:
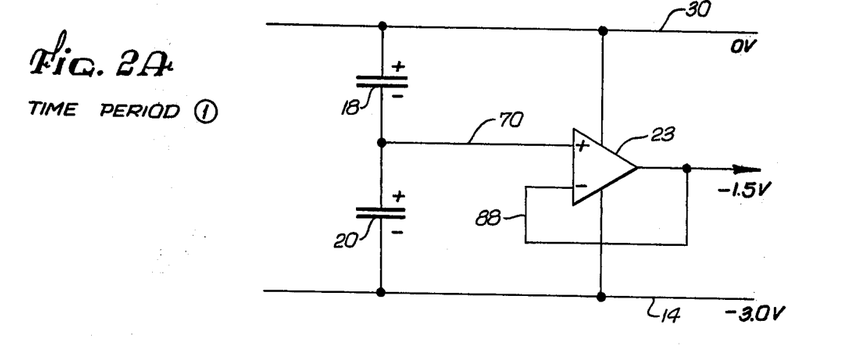
FIGS. 2A and 2B illustrate two alternately switched modes of the voltage divider circuit of FIG. 1.
Figure 2B:
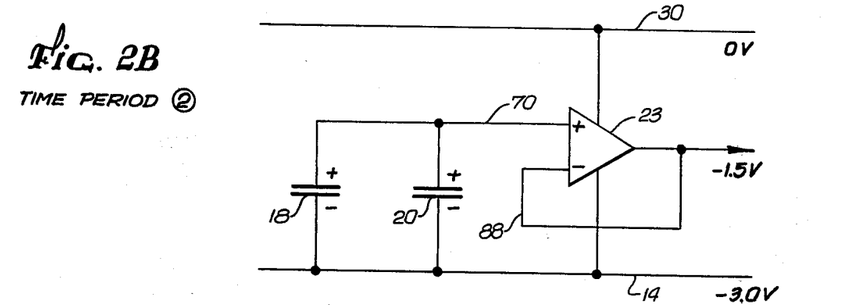

The voltage halver section 12 has a first capacitor 18 and a second capacitor 20 which are alternately switched from a series connection across the −3.0 volts supply as shown in FIG. 2A, to a parallel connection as shown in FIG. 2B. The charge polarities of the capacitors 18 and 20 are maintained as they are switched from series connection to parallel connection. Specifically, the positive plate of the capacitor 18 is connected to the positive plate of the capacitor 20 in the parallel mode.

As the capacitors 18 and 20 are periodically switched between the two alternate modes, the voltage across the capacitor 20 (and also the capacitor 18) asymptotically approaches a value of one half the input supply voltage. This voltage across the capacitors 18 and 20, which is 1.5 volts in the illustrated embodiment, is used as a reference voltage for a voltage regulator 22 (FIG. 1). The voltage regulator 22 includes a differential amplifier 23 which has a very high input impedance, and a buffer driver transistor 24 which provides the −1.5 volt supply voltage at 16. As will become more clear in the following detailed description, the high impedance of the voltage regulator input allows the capacitors 18 and 20 to be sufficiently small for practical integration on a monolithic chip. Furthermore, the voltage regulator 22 buffers the capacitors 18 and 20 from the load which further reduces the power consumed by the divider circuit 10 of the illustrated embodiment.

The control signals for switching the capacitors 18 and 20 between the series and parallel connection modes are supplied by a switching signal section 26 connected to the halver section 12. The switching signal section 26 has an input 28 for a 512 Hz digital input signal which is used to generate individual control signals, designated A, B and $\overline{B}$. In the illustrated embodiment, the 512 Hz input signal is at a −1.5 volt logic level. This logic level is shifted to a higher −3.0 volt logic level by the switching signal section 26. The switching signal section 26 also generates "break-before-make" delays in the control signals A, B and $\overline{B}$ to prevent unwanted charge loss from the capacitors 18 and 20 during switching, as will be more fully explained below.

The −3.0 input supply voltage can be provided by a battery for example, such as a lithium battery which typically can supply voltages of 2.8 to 3.5 volts. Thus, the −3.0 volts bus 14 can be connected to the negative terminal of a lithium battery (not shown) and the ground or zero volt bus 30 is connected to the positive terminal of the battery.

In order to series connect the capacitors 18 and 20 across the full −3.0 volts, a p-channel switching field-effect transistor (FET) 32 is provided, connecting the positive plate of the capacitor 18 to the ground bus 30. The negative plate of the capacitor 18 is connected to the positive plate of the capacitor 20 by a second p-channel switching transistor 34. The negative plate of the capacitor 20 is connected directly to the −3.0 volt bus 14. When the switching transistors 32 and 34 are turned on, the capacitors 18 and 20 are effectively connected in series across the −3.0 volt input supply voltage as indicated in FIG. 2A. A control signal line 36 from the switching signal section 26 provides the control signal A to the gates of the switching transistors 32 and 34. The transistors 32 and 34 are turned on when the control signal A is at −3.0 volts, which corresponds to a logical LOW.

The positive plate of the first capacitor 18 is also coupled to the positive plate of the capacitor 20 by a third p-channel switching transistor 38. The negative plate of the capacitor 18 is coupled to the negative plate of the second capacitor 20 by a fourth switching transistor 40 which is an n-channel FET. The switching transistors 38 and 40 are turned off when the switching transistors 32 and 34 are turned on, which series connects the capacitors 18 and 20.

Figure 3:
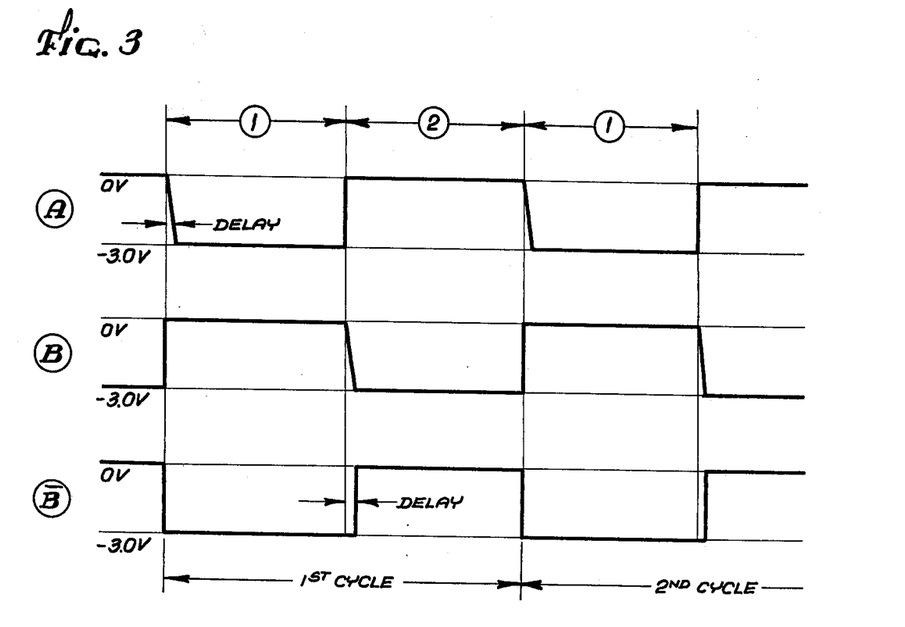
FIG. 3 is a timing diagram for various control signals of the voltage divider circuit of FIG. 1.

The control signals for the switching transistors 38 and 40 are designated B and $\overline{B}$, respectively. These signals are supplied on control signal lines 42 and 44, respectively, from the switching signal section 26. When the control signal A is a logical LOW (during which time the switching transistors 32 and 34 are turned on), the control signals B and $\overline{B}$ are a logical HIGH (zero volts) and a logical LOW, respectively. The time periods during which the control signals A, B and $\overline{B}$ maintain these respective logic states are designated time period "1" as shown in FIG. 3. Thus, the capacitors 18 and 20 are series-connected during time period "1".

Before the start of time period "2", in which the capacitors 18 and 20 are parallel-connected, the control signal A rises to a logical HIGH, which turns off the switching transistors 32 and 34. This disconnects the positive plate of the capacitor 18 from the ground bus 30. It also disconnects the negative plate of the capacitor 18 from the positive plate of the capacitor 20. Thus the capacitors 18 and 20 are no longer series-connected.

After a short delay of approximately 500 nanoseconds to 1 microsecond, the control signal B drops to a logical LOW state and the control signal $\overline{B}$ rises to a logical HIGH. This time delay is shown exaggerated in FIG. 3. With the control signal B at a logical LOW, the p-channel transistor 38 is turned on, thus connecting the positive plate of the capacitor 18 to the positive plate of the capacitor 20. The logical HIGH state of the control signal $\overline{B}$ turns on the n-channel switching transistor 40, thereby connecting the negative plate of the capacitor 18 to the negative plate of the capacitor 20. As a result, the capacitors 18 and 20 are parallel-connected, as represented in FIG. 2B. The short delay from when the transistors 32 and 34 are turned off until the transistors 38 and 40 are turned on prevents unwanted charge loss from the capacitors 18 and 20 during switching from the series connection mode to the parallel connection mode. At the end of the time period "2", the switching transistors 38 and 40 are turned off, disconnecting the capacitors 18 and 20 from the parallel connection. After another time delay, the switching transistors 32 and 34 are turned back on, and the capacitors 18 and 20 are re-connected in series in the subsequent time period "1" (FIG. 3).

The control signals A, B and $\overline{B}$ are generated by the switching signal section 26, which includes an inverter 46. The inverter 46 includes a pair of CMOS (complementary metal oxide semiconductor) transistors 48 and 50, the gates of which are connected to the 512 Hz input 28. The outputs of the CMOS transistors 48 and 50 are connected to a first input 51 of a CMOS level shifter 52. A second input 53 of the level shifter 52 is connected to the 512 Hz input 28. The level shifter 52 includes a pair of p-channel input transistors 54 and 56 coupled to a pair of cross-coupled n-channel transistors 58 and 60. The output of the n-channel transistor 60 and the p-channel transistor 56 comprise one output 61 of the level shifter 52. The output 61 is connected to the control signal line 36 which carries control signal A. The output of the p-channel transistor 54 and the n-channel transistor 58 comprise an inverted output 63 of the level shifter 52. The inverted output 63 is connected to the control signal line 42 which carries control signal B. Accordingly, the control signal B is inverted with respect to the control signal A.

The time delay represented in FIG. 3 is the time required for one output of the level shifter 52 to change logic stages after the other output has changed logic states. The delay is caused by the turn-on time required by either of the n-channel transistors 58 or 60 when the corresponding p-channel transistor 54 or 56 turns off. The control signal line 42 is also connected to the input of a second inverter 62 which includes a p-channel transistor 64 and a n-channel transistor 66. The output of the inverter 62 is the control signal line 44 which carries the control signal $\overline{B}$.

To illustrate the switching operation of the voltage divider 10, it may be assumed that the starting time period is time period "1". Thus, control signals A and $\overline{B}$ are initially LOW and control signal B is HIGH as shown in FIG. 3. As a result, the switching transistors 32 and 34 are turned on, and the switching transistors 38 and 40 turned off such that the capacitors 18 and 20 are connected in series across the −3.0 volt supply as represented in FIG. 2A. To provide a specific example of the operation of the divider circuit 10, the capacitors 18 and 20 may be assigned the values of 2 picofarads and 8 picofarads, respectively. These values are orders of magnitude smaller than many previous designs.

Using the relationship:

$$Q = CV$$

(where Q is the charge on a capacitor, C is the capacitance value of the capacitor and V is the voltage on the capacitor), the total charge on the capacitors 18 and 20 may be found. Accordingly, the individual voltages across the capacitors 18 and 20 may be calculated to be approximately −2.4 and −0.6 volts, respectively, where the total applied voltage is −3.0 volts during time period "1" of the first cycle. Since the switching transistors 32 and 34 are turned off before the switching transistors 38 and 40 are turned on, the amount of charge which accumulates on the capacitors 18 and 20 during time period "1" which is lost as a result of switching from the series connection of FIG. 2A to the parallel connection of FIG. 2B is minimized. Assuming that the total charge calculated during time period "1" is maintained on the capacitors during time period "2", the voltage on the capacitors 18 and 20 during time period "2" can be calculated, using the relationship $V = Q/C_t$ (where $C_t$ is the total parallel capacitance), to be −0.96 volts. Thus, the absolute value of the voltage across capacitor 20 increases from 0.6 to 0.96 volts during the first cycle of time periods "1" and "2". (Henceforth, the individual capacitor voltages will be given as absolute values across each capacitor where the voltage polarity is as shown in FIG. 1.)

During time period "1" of the second cycle, capacitors 18 and 20 are again connected in series across the −3.0 V input supply voltage. The voltages and charges on capacitors 18 and 20 will change in time period "1" of cycle 2 based on the difference between the input supply voltage and two times the voltage across the capacitors in the time period "2" parallel connection. The distribution of this voltage difference (designated $V_{Dif}$) will be according to the following relationships:

Voltage change (for capacitor 18) = $V_{Dif} \times C_{20}/(C_{18}+C_{20})$

Voltage change (for capacitor 20) = $V_{Dif} \times C_{18}/(C_{18}+C_{20})$ where the capacitance of the capcitors 18 and 20 are designated $C_{18}$ and $C_{20}$, respectively. Using the above relationships it will be found that the voltage difference $V_{Dif}$ will be 1.08 volts. The voltage change on capacitor 18 will be 0.864 volts and the voltage change on capacitor 20 will be 0.216 volts. The voltage across capacitor 20 will therefore be 0.96+0.216 volts or 1.176 volts at the end of time period "1" of cycle 2. The charge can then be calculated as before and the voltage of the parallel connection of cycle 2 will be found to be 1.3056 volts.

During time period "1" of the third cycle, the voltages on capacitors 18 and 20 will change as before in cycle 2. However, the voltage difference is $V_{Dif}$ less this time (0.3888 volts). Therefore the change across capacitor 18 is 0.31104 volts and the change across capacitor 20 is 0.7776 volts. The voltage across capacitor 20 during time period "2" will therefore be 1.4300 volts. The above process will continue until the voltages across capacitor 20 and capacitor 18 reach one half the applied supply voltage or 1.500 volts across each capacitor. The succeeding cycles 4 thorugh 8 are set out as follows:

| CYCLE | VOLTAGE ACROSS CAPACITOR 20 |
|-------|------------------------------|
| 4     | 1.4748 V                     |
| 5     | 1.4909 V                     |
| 6     | 1.4967 V                     |
| 7     | 1.4988 V                     |
| 8     | 1.4996 V                     |

As indicated above, at cycle number 8, the voltage across the capacitor 20 will be 1.4996 volts. Thus it takes approximately 8 cycles in this example for the voltage to stablize at one half the input supply voltage to within one millivolt. For an application such as a liquid crystal display for a digital watch, a tolerance of 50 millivolts is acceptable.

The −1.5 voltage (referenced to the positive terminal of the input supply voltage) at the capacitor 20 provides a reference input voltage to an input 70 of the voltage regulator 22. The voltage regulator 22 has unity gain and regulates the −1.5 volts at the output 16. In addition, the driver transistor 24 buffers the capacitor 20 from the load at the output 16.

The CMOS differential amplifier 23 of the voltage regulator 22 has two CMOS input legs 74 and 76. The first input leg 74 includes a p-channel input transistor 80 and an n-channel load transistor 82. Similarly, the second input leg 76 has a p-channel input transistor 84 and an n-channel load transistor 86. The gate of the input transistor 80 is the noninverting input of the differential amplifier 23 and is connected to the capacitor 20 by the input line 70. The gate of the input transistor 84 is the inverting input 88 of the differential amplifier 23.

The differential amplifier input transistor 80 has an extremely high input impedance and thus does not significantly load the reference capacitor 20. In the illustrated embodiment, the input transistor 80 is an insulated gate MOSFET with an input impedance in excess of 100 megohms. Since the input transistor 80 does not draw a significant amount of current from the capacitor 20, charge storage requirements of the capacitors 18 and 20 are correspondingly reduced.

The differential amplifier 23 further has a current source 90 which is connected to the first and second input legs 74 and 76, respectively. In the illustrated embodiment the current source 90 is a current-mirrored p-channel MOSFET which requires only a "weak inversion" to turn on. This weak inversion current source allows the regulator 22 to have extremely low power consumption which is typically 0.24 microwatts (80 nanoamps at 3 volts). Thus, it is seen that the power consumption of the voltage divider circuit 10 is near zero once the reference voltage of −1.5 volts across the capacitor 20 is established. Low power consumption is particularly important for battery applications to extend the life of the battery power source.

The voltage regulator 22 further has a frequency compensation capacitor 91 which provides a feedback path from the output 92 of the differential amplifier 23 to the inverting input 88. The frequency compensation capacitor 91 stablizes the amplifier 23 to prevent oscillation. The capacitor 91 may have a capacitance value of from two picofards to five picofarads, for example.

The output 92 of the differential amplifier 23 is connected to the gate of the buffer driver transistor 24. The output of the transistor 24 is connected to the divider circuit 10 output at 16 and also to the inverting input 88 of the transistor 84. The output of the transistor 24 at 16 provides the supply voltage of $-1.5$ volts for powering load circuits such as a duplexed liquid crystal display. Accordingly, the display loads the transistor 24 rather than the reference capacitor 20. Since the capacitors 18 and 20 are not loaded by the display (or the differential amplifier 23), these capacitors can have extremely small capacitances making it quite practical to fabricate them on the chip. Thus it is no longer necessary to have external capacitors which increase the cost and complexity of assembling devices needing two or more supply voltages. Furthermore, the absence of external capacitor connections increases the reliability of the devices.

In addition, since the capacitors 18 and 20 do not directly drive the display, the capacitors need not be periodically refreshed to restore current drawn by the display. This reduces power lost through the switching circuit used to refresh the capacitors. Furthermore, the buffer driver transistor 24 draws a steady supply current from the battery.

A parasitic capacitance can develop in transistorized devices such as those fabricated utilizing a CMOS metal gate semiconductor process or other semiconductor fabrication processes. This parasitic capacitance can, if left uncorrected, degrade the charge balancing of the capacitors 18 and 20 as they are switched between series and parallel connections. This parasitic capacitance is represented by a capacitor 100 in FIG. 1. In order to compensate for any charge imbalances resulting from the parasitic capacitance, a balancing capacitor 102 is added to the voltage halver section 12. During time period "1", both the parasitic capacitor 100 and the balancing capacitor 102 are shorted out by switching transistors 32 and 34, respectively, and thus have no charge on them. During time period "2", the parasitic capacitor 100 becomes charged to the voltage across the switching transistor 32. This can rob some of the charge from the positive plate of the capacitor 18. In order to neutralize this effect, the balancing capacitor 102 is provided a capacitance value which is substantially equal to the capacitance of the parasitic capacitor 100. The balancing capacitor 102 will charge in the opposite direction of the parasitic capacitor 100, thereby resulting in a total charge injection of zero.

Thus, it is seen from the foregoing that the voltage divider circuit 10 of the illustrated embodiment divides the voltage supplied by a 3 volt lithium battery to 1.5 volts which can be used to drive a two level multiplexed (duplexed) liquid crystal watch display. The above-described circuit can divide any applied voltage exactly in half with extreme accuracy and thus has a variety of applications other than driving liquid crystal displays.

It is further recognized that the voltage divider circuit 10 can be totally integrated on a single chip or as a system component of a large chip and does not require any external components. Furthermore, the voltage divider circuit provides extremely low power consumption.

It will, of course, be understood that modifications of the present invention, in its various aspects, will be apparent to those skilled in the art, some being apparent only after study and others being merely matters of routine electronic design. Accordingly, other embodiments of the present invention are also possible with their specific design dependant upon the particular application. For example, the principle used to divide the applied supply voltage in half as previously explained in reference to the preferred embodiment, can also be utilized to divide the supply voltage by any fraction, such as one-third and two-thirds.

FIGS. 4A through 4D show an example of a switched capacitor voltage divider circuit that divides the supply voltage, $V_{supply}$, by one-third and two-thirds simultaneously using a four phase switching approach. The circuit configuration associated with each of the four time periods is shown in a simplified form analogous to the representations shown in FIGS. 2A and 2B for the voltage divider circuit 10 of FIG. 1.

Figure 4A:
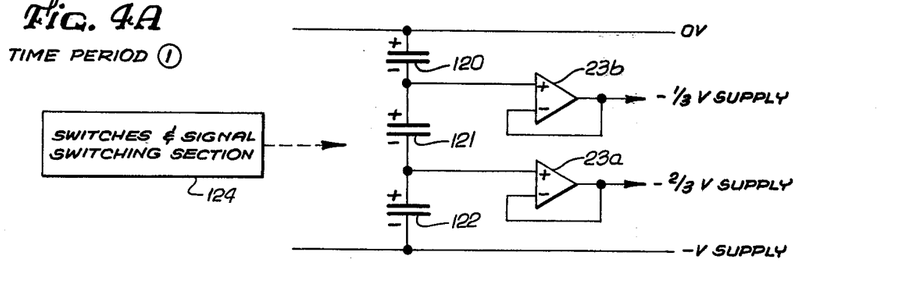
FIGS. 4A to 4D illustrate an alternative embodiment of the present invention.

In the first phase, time period "1", three capacitors 120-122 are connected in series across the supply voltage $V_{supply}$, as shown in FIG. 4A. The voltage divider circuit of FIGS. 4A-4D has two voltage regulators each of which is similar to the voltage regulator 22 of FIG. 1. Accordingly, the circuit has a first high input impedance differential amplifier 23a which has a non-inverting input connected to the positive plate of the capacitor 122. A second differential amplifier 23b of the second voltage regulator has a non-inverting input connected to the negative plate of the capacitor 120. The output of each differential amplifier is connected to a driver transistor (not shown) similar to transistor 24 of FIG. 1.

Figure 4B:
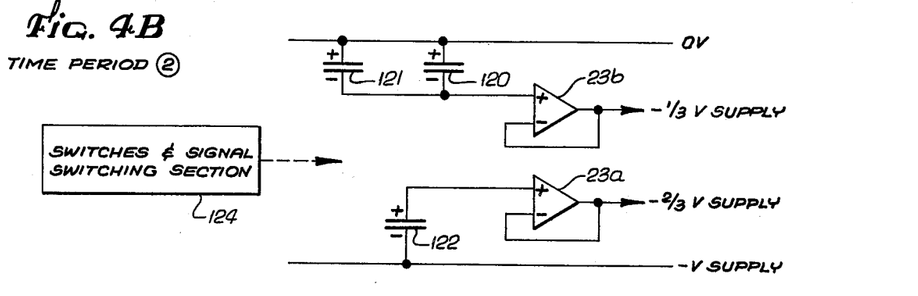

During time period "2", the capacitors are switched such that the capacitors 120 and 121 are disconnected from the capacitor 122 with the capacitors 120 and 121 connected in parallel to ground as shown in FIG. 4B. The capacitors 120-122 are interconnected by appropriate switching transistors which are controlled by a switching signal section similar to that shown for the voltage divider circuit 10 of FIG. 1. The transistor switches and switching signal section are represented at 124 and their implementation, based on the description of the corresponding elements of the voltage divider circuit 10 of FIG. 1, and the functions described herein, is a matter of routine electronic logic design.

In the illustrated embodiment, the capacitance values of capacitors 120 and 122 are at least five times greater than that of capacitor 121. Thus, during time period "2" capacitor 121 transfers charge to capacitor 120 equalizing the voltages across capacitors 120 and 121 which increases the absolute value of the voltage across the capacitor 120.

Figure 4C:
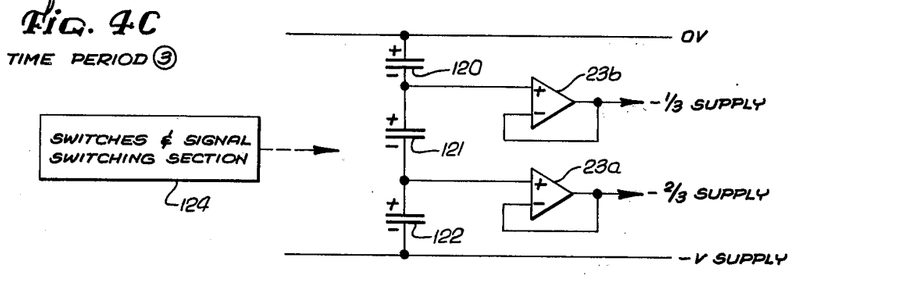
Figure 4D:
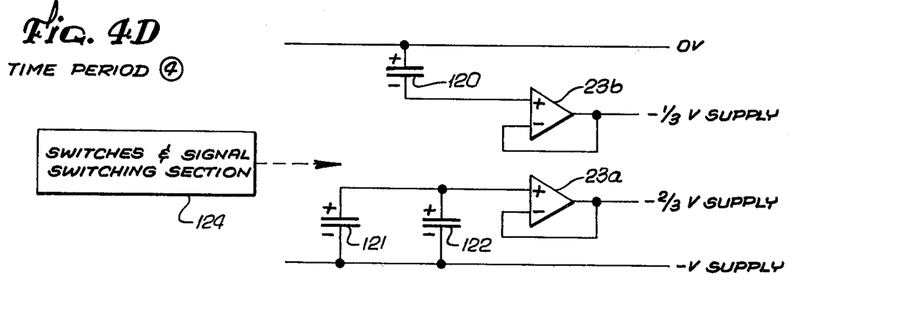

After the capacitors are reconnected in series as shown in time period "3" of FIG. 4C, additional charge is stored on the capacitors 120-122, based upon the difference between the supply voltage and the total voltages on the three capacitors at the end of time period "2". This occurs in a manner similar to that described for the two capacitors 18 and 20 during time period "1" of the circuit of FIG. 1.

Capacitors 121 and 122 are connected in parallel during time period "4" (FIG. 4D) with capacitor 120 disconnected from the capacitors 121 and 122. Capacitor 121 transfers charge to the capacitor 122 equalizing the voltages across the two capacitors which raises the absolute value of the voltage across the capacitor 122. The switches and switching signal section 124 repeatedly switch the capacitors through the four phase shown in FIGS. 4A-4D until the voltage across each of the capacitors 120-122 is equivalent which is one-third the supply voltage $V_{supply}$. Accordingly, the output voltage of the differential amplifier 23b approaches one-third of the supply voltage and the output of the differential amplifier 23a approaches two-thirds the supply voltage. A possible application of the one-third and two-third voltage divider is the generation of the voltages necessary for driving a three level multiplex (triplexed) liquid crystal display often used in LCD pocket calculators.

Figure 5A:
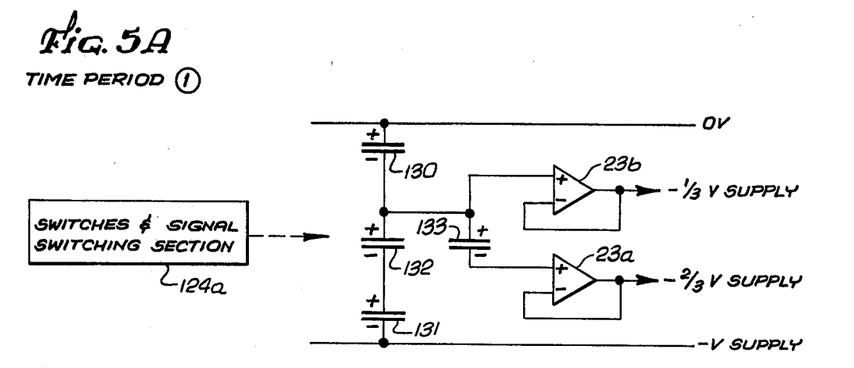
FIGS. 5A and 5B illustrate another alternative embodiment of the present invention.
Figure 5B:
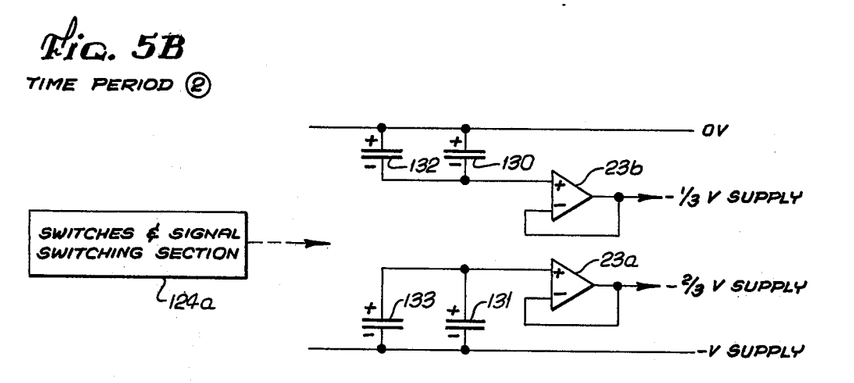

An alternative embodiment of the one-third and two-thirds voltage divider circuit is shown in FIGS. 5A and 5B. This circuit, however, utilizes a two phase switching approach. During time period "1", the capacitors 130 and 131 are connected in series with a parallel combination of capacitors 132 and 133 connected between the capacitors 130 and 131. The circuit of this embodiment also utilizes two voltage regulators as represented by the differential amplifiers 23A and 23b. During time period "2", as shown in FIG. 5B, the capacitor 132 is switched in parallel with the capacitor 130 while the capacitor 133 is switched in parallel with the capacitor 131. A plurality of transistor switches and a signal switching section indicated at 124a periodically switches the capacitors 130-133 back and forth between the configurations represented in time periods "1" and "2". The switches and switching signal section 124a are similar to that described in FIG. 1 and FIGS. 4A-4D. This approach has the advantage of requiring only a two phase switching operation.

Each of the embodiments described provides extremely low power consumption. In addition, each can be totally integrated as a system component of a chip and does not require any external components.

Other division ratios such as one-fourth or one-fifth of the supply voltage are also possible. As such, the scope of the invention should not be limited by the particular embodiment herein described but should be defined only the appended claims and equivalents thereof. Various features of the invention are set forth in the following claims.

I claim:

1. A monolithic integrated circuit for dividing the voltage supplied by a power supply comprising:
   a plurality of capacitors wherein one of the capacitors is a reference capacitor;
   switching means for periodically coupling at least two of the capacitors in series to the power supply during a first time period and for periodically coupling at least two of the capacitors in parallel during a second time period such that the voltage across one of the capacitors provides a reference voltage which approaches a predetermined fraction of the supply voltage of the power supply; and
   a voltage regulator having an input operably connected to the capacitor providing the reference voltage, and an output which provides a supply voltage at the predetermined fraction of the power supply, said voltage regulator having an input impedance in excess of 10 meghoms to minimize loading of the capacitors.

2. The voltage divider of claim 1 wherein the predetermined fraction is one-half.

3. The voltage divider of claim 1 wherein the predetermined fraction is one-third.

4. The voltage divider of claim 1 wherein the voltage regulator includes a differential amplifier having an input transistor with an input impedance in excess of 10 megohms, said input transistor having a gate operably connected to the reference capacitor.

5. The voltage divider of claim 4 wherein the differential amplifier includes a weak inversion current source wherein the power consumed by the differential amplifier is reduced.

6. The voltage divider of claim 1 wherein the voltage regulator includes a buffer driver for operable connection to a load, said buffer driver to buffer the capacitors from the load to prevent loading of the capacitors by the load.

7. The voltage divider of claim 1 wherein the power supply has a positive terminal and a negative terminal and each of the capacitors has a positive plate and a negative plate, said switching means comprising a first switching transistor operably connecting one plate of the first capacitor to the positive terminal of the power supply and a second switching transistor operably connecting the other plate of the first capacitor to one plate of the second capacitor; and wherein the other plate of the second capacitor is operably connected to the negative terminal of the power supply and said switching means further comprises control signal means for turning the first and second switching transistors on during the first time period so that the first and second capacitors are connected in series to the power supply during the first time period.

8. The voltage divider circuit of claim 7 wherein the switching means further comprises a third switching transistor operably connecting the positive plate of the first capacitor to the positive plate of the second capacitor and a fourth switching transistor operably connecting the negative plate of the first capacitor to the negative plate of the second capacitor, and the control signal means further comprising means for turning the first and second switching transistors off and for turning the third and fourth switching transistors on during the second time period, so that the first and second capacitors are operably connected in parallel during the second time period.

9. The voltage divider circuit of claim 8 wherein the control signal means further comprises delay means for delaying the turning on of the third and fourth switching transistors until the first and second switching transistors are turned off and for delaying the turning on of the first and second switching transistors until the third and fourth switching transistors are turned off to prevent the discharge of the first and second capacitors while the capacitors are being switched from series connection to parallel connection and vice versa.

10. The voltage divider circuit of claim 1 further comprising a third capacitor operably connected to one of the first and second capacitors to compensate for parasitic capacitance in the monolithlic integrated circuit.

11. The voltage divider circuit of claim 10 further comprising means for operably connecting the third capacitor in parallel with the first and second capacitors during the second time period to compensate for parasitic capacitance in the monolithic integrated circuit.

12. A monolithic integrated circuit for dividing the voltage supplied by a power supply comprising:
   first and second capacitors;
   switching means for cyclically connecting the capacitors in series to the power supply during a first time period and for cyclically connecting the capacitors in parallel during a second time period such that the voltage across one of the capacitors provides a reference voltage which approaches a predetermined fraction of the supply voltage of the power supply; and a voltage regulator which includes a CMOS differential amplifier and a buffer driver transistor, said amplifier having an input operably connected to the capacitor providing the reference voltage and an output operably connected to the driver transistor, said regulator being responsive to the reference voltage for providing a regulated output from the driver transistor, and said amplifier input having a sufficiently large input impedance such that the capacitors may be small enough for practical fabrication as a portion of the monolithic integrated circuit.

13. A monolithic integrated circuit for dividing the voltage supplied by a power supply by a third, comprising:

first, second, and third capacitors wherein the third capacitors is a reference capacitor;

switching means for periodically coupling the capacitors in series to the power supply during a first and a third time period, for coupling the first and second capacitors in parallel during a second time period and for coupling the second and reference capacitors in parallel during a fourth time priod such that the voltage across the reference capacitor provides a reference voltage which approaches one-third of the supply voltage of the power supply; and a voltage regulator having an input operably connected to the reference capacitor and an output which provides a supply voltage at one-third of the power supply voltage, said voltage regulator having an input impedance in excess of 10 megohms to minimize loading of the capacitors by the regulator.

14. A monolithic integrated circuit for dividing the voltage supplied by a power supply by a third, comprising:

first, second, third and fourth capacitors wherein the fourth capacitor is a reference capacitor;

switching means for periodically coupling the second and third capacitors in parallel and the parallel combination of the second and third capacitors in series with the first and reference capacitors to the power supply during a first time period and for coupling the first and second capacitors in parallel and the third and reference capacitors in parallel during a second time period such that the voltage across the reference capacitor provides a reference voltage which approaches one-third of the supply voltage of the power supply; and a voltage regulator having an input operably connected to the reference capacitor and an output which provides a supply voltage at one-third of the power supply voltage, said voltage regulator having an input impedance in excess of 10 megohms to minimize loading of the capacitors by the regulator.

15. A monolithic integrated circuit for dividing the voltage supplied by a power supply comprising:

a plurality of capacitors wherein one of the capacitors is a reference capacitor;

switching means for periodically coupling the capacitors in series to the power supply during a first time period and for alternately coupling one or more pairs of capacitors in parallel during one or more intervening time periods such that the voltage across each capacitor approaches the same voltage wherein the voltage across the reference capacitor provides a reference voltage of the power supply determined by the number of capacitors coupled in series to the power supply during the first time period; and a voltage regulator having an input operably connected to the reference capacitor and an output which provides a supply voltage at the predetermined fraction of the power supply, said voltage regulator having an input impedance in excess of 10 megohms to minimize loading of the capacitors by the regulator.

16. A monolithic integrated circuit for dividing the voltage supplied by a power supply comprising:

a plurality of capacitors wherein one of the capacitors is a reference capacitor;

switching means for periodically connecting the capacitors in series to the power supply during a first time period and for connecting a capacitor in parallel with the reference capacitor during a second time period such that the voltage across the reference capacitor provides a reference voltage which approaches a predetermined fraction of the supply voltage of the power supply; and a voltage regulator which includes a differential amplifier having an input transistor which has a gate operably connected to the reference capacitor, said transistor having an input impedance in excess of 10 megohms to minimize loading of the capacitors by the regulator, said regulator having an output which provides a supply voltage at the predetermined fraction of the power supply.

17. A monolithic integrated circuit for dividing the voltage supplied by a power supply comprising:

a plurality of capacitors wherein one of the capacitors is a reference capacitor;

switching means for periodically connecting the capacitors in series to the power supply during a first time period and for connecting a capacitor in parallel with the reference capacitor during a second time period such that the voltage across the reference capacitor provides a reference voltage which approaches a predetermined fraction of the supply voltage of the power supply; and a voltage regulator having an input operably connected to the reference capacitor and an output which provides a supply voltage at the predetermined fraction of the power supply, said voltage regulator having an extremely high input impedance to minimize loading of the capacitors by the regulator, said regulator including a buffer driver for operable connection to a load, said buffer driver to buffer the capacitors from the load to prevent loading of the capacitors by the load.

18. A monolithic integrated circuit chip for multiplying the supply voltage supplied by a power supply by a predetermined factor comprising:

a plurality of capacitors disposed on the chip;

switching means for cyclicly coupling at least two of the capacitors in series to the power supply during a first time period and for cyclicly coupling at least two of the capacitors in parallel during a second time period so that at least one of the capacitors provides a reference voltage; and a voltage regulator having an input operably connected to the capacitor providing the reference voltage, said regulator being responsive to the reference voltage for providing a regulated output at a voltage level which is equal to the supply voltage multiplied by the predetermined factor, and said regulator input having a sufficiently large input impedance such that the capacitors may be small enough for practical fabrication as a portion of the monolithic integrated circuit.

19. The integrated circuit chip of claim 18 wherein the predetermind factor is one half.

20. A monolithic integrated circuit for dividing the voltage supplied by a power supply and driving a load, comprising:

first and second capacitors;

switching means for cyclicly coupling the capacitors in series to the power supply during a first time period and for cyclicly coupling the capacitors in parallel during a second time period so that the voltage across one of the capacitors provides a reference voltage which approaches a predetermined fraction of the supply voltage of the power supply; and a voltage regulator having an input operably connected to the capacitor providing the reference voltage, and a buffer driver to buffer the capacitors from the load to prevent loading of the capacitors by the load, said regulator being responsive to the reference voltage for providing a regulated output from the buffer driver.

* * * * *